(12) United States Patent
Salant et al.

(10) Patent No.: US 6,393,440 B1
(45) Date of Patent: May 21, 2002

(54) DATA STRUCTURE FOR KEEPING TRACK OF OBJECTS REMAINING TO BE TRACED BY CONCURRENT GARBAGE COLLECTOR

(75) Inventors: Eliot Salant; Elliot K. Kolodner, both of Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/458,824

(22) Filed: Dec. 13, 1999

(51) Int. Cl.$^7$ .............................................. G06F 12/00
(52) U.S. Cl. ...................... 707/206; 707/202; 707/203; 707/204
(58) Field of Search ............................. 707/202, 203, 707/204, 205, 206

(56) References Cited

U.S. PATENT DOCUMENTS

| | | | | |
|---|---|---|---|---|
| 4,775,932 A | * | 10/1988 | Oxley et al. ................. | 707/206 |
| 4,989,134 A | * | 1/1991 | Shaw .......................... | 707/206 |
| 5,088,036 A | * | 2/1992 | Ellis et al. .................. | 707/206 |
| 5,687,368 A | * | 11/1997 | Nilsen ......................... | 707/103 |
| 5,848,423 A | * | 12/1998 | Ebrahim et al. ............. | 707/206 |
| 6,098,089 A | * | 8/2000 | O'Connor et al. .......... | 709/104 |
| 6,226,653 B1 | * | 5/2001 | Alpern et al. ............... | 707/206 |
| 6,289,360 B1 | * | 9/2001 | Kolodner et al. ........... | 707/206 |
| 6,308,185 B1 | * | 10/2001 | Grarup et al. ............... | 707/206 |

OTHER PUBLICATIONS

Doligez et al., "Portable Unobtrusive Garbage Colection for Multiprocessor Systems", *Conference Record of the Twenty-first Annual ACM*, pp. 70–83, (1994).

Dijkstra et al., "On–the–Fly Garbage Collection: An Exercise in Cooperation", *Communications of the ACM* vol. 21, No. 11, pp. 966–975, (1978).

Detreville, "Experience with Concurrent Garbage Collectors for Modula–2+", *Digital Systems Research Center* chapter 64, pp. 1–605 (1990).

Jones et al., "Garbage Collection: Algorthms for Automatic Dynamic Memory Management"*British Library Cataloguing in Publication Data*, pp. 87–88.

* cited by examiner

*Primary Examiner*—Thomas Black
*Assistant Examiner*—Frantz Coby
(74) *Attorney, Agent, or Firm*—Browdy and Neimark (57) ABSTRACT

A program storage device readable by machine, tangibly embodying a program of instructions executable by the machine to perform method steps for performing operations among a reader thread and two or more writer threads. The method includes the following steps of providing a generic data structure for the threads. The generic data structure is associated with Insert, Extract and isEmpty operations. The specified steps include inserting objects to selected parts of the generic data structure by the writer threads, using the Insert operation. The steps further includes extracting objects by the reader thread from selected parts of the generic data structure, using the Extract operation. There follows the step of determining if there are remaining objects in selected parts of the generic data structure utilizing isEmpty operation. The isEmpty operation is not synchronized with the Insert and Extract operations. No synchronization is required between the writer threads themselves and between the reader thread and the writer threads.

21 Claims, 6 Drawing Sheets

DATA STRUCTURE FOR KEEPING TRACK OF OBJECTS REMAINING TO BE TRACED BY CONCURRENT GARBAGE COLLECTOR

FIELD OF THE INVENTION

The present invention is in the general field of memory management and concerns more specifically automatic memory management or garbage collection (GC).

BACKGROUND OF THE INVENTION

Garbage collectors free the space that can no longer be used by a program so that this space can be reused for future allocations. In many systems, the unit of space allocated by a program and freed by the collector is called an object. A so-called "concurrent" garbage collector represents a general class of collectors in which the mutators continue to work while the collector is active. Note, however, that there may be a point during the GC cycle where all the mutator threads need to be stopped at once. An on-the-fly collector based on the original article by Dijkstra et al. [Edsgar W. Dijkstra, Leslie Lamport, A. J. Scholten, E. F. Scholten, E. F. Steffens, On-the-fly Garbage Collection: An Exercise in Cooperation, November, 1978, *Communications of the ACM*] does not have a synchronization point where all threads are stopped at once. Doligez and Gonthier [Damien Doligez, Georges Gonthier, Portable Unobstrusive Garbage Collection for Multiprocessor Systems, January, 1994, *Conference Record of the Twenty-first Annual ACM Symposium on Principles of Programming Languages*] described a more advanced and more efficient on-the-fly algorithm.

An on-the-fly garbage collector, i.e., a collector that reclaims unused space in parallel to the running program without stopping it for the collection is a fascinating theoretical idea with important benefits in practice. In particular, on many server platforms, the actual operation of stopping all parallel threads in order to do a garbage collection task is a high cost, time consuming operation. The reason is that the threads cannot be stopped at any point and, thus, there is a relatively long wait until the last (of many) threads reaches a point where it may stop. Additionally, stopping all program threads during garbage collection does not take advantage of all available processors.

On-the-fly garbage collectors are well known in the literature. On-the-fly collectors generally use mark\sweep whereas concurrent collectors may also use other garbage collection techniques e.g. copying. In the mark\sweep type of collectors, there is normally a first step, in which the live memory objects in the heap are marked and there is a second step in which the unmarked objects are "swept", i.e., reclaimed for future use.

The trace of live objects is normally (although not necessarily) done with a 3-color scheme: Objects are white if they have not been traced, they are marked gray if they have been traced but their immediate children have not yet been traced, and they are marked black if they have been traced and their immediate children have been traced as well. The trace proceeds step by step by taking a gray object, marking it black and marking gray all its white children.

Figure 1:
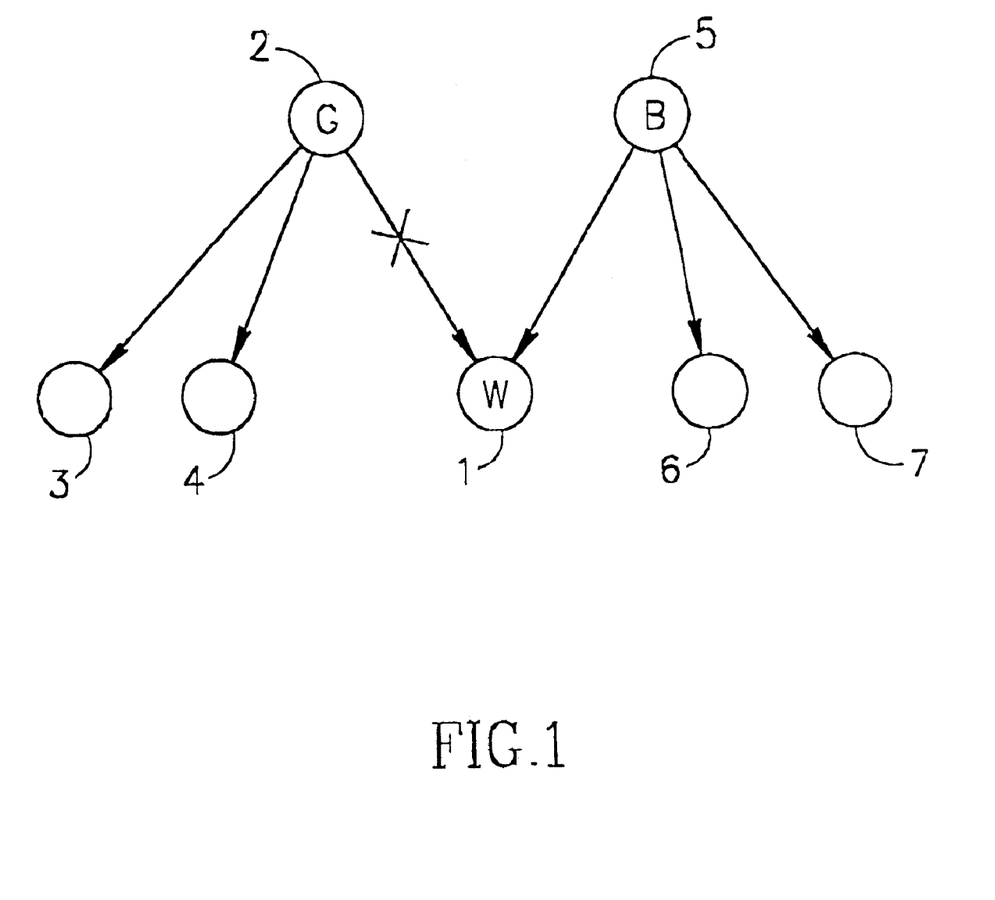
FIG. 1 is schematic illustration of objects in a heap, which serves for explaining concepts of on-the-fly collector according to the prior art.

The fact that the collector works "on-the-fly" makes its life harder. Thus, while it is scanning the heap, the user program threads change the reachability graph concurrently. If the collector uses this naive scheme, it may miss some live items. If, for example, (see FIG. 1) the user program moves a white node (1) from being referenced by a gray object (2) (i.e., whose children (3 and 4) have not yet been traced) to being referenced by a black object (5) (whose sons (6, 7) will not be traced any more), then the white object (1) (and its sons, if any) may not be traced.

To solve this problem and let the collector spot all live objects during the trace, the program threads help the collector through use of a write barrier. During the garbage collecting cycle, whenever a pointer is modified from pointing to an object A into pointing to object B, either A or B are marked gray by the modifier thread (by the embodiment of FIG. 1 object(1) is marked gray either when the connection to (5) is created or when reference from (2) is erased). Choosing which of the objects to mark depends on the specific algorithm or the stage of the algorithm. Sometimes, algorithms may mark both A and B gray and sometimes only A or only B. This operation of the program is sometimes called the. "write barrier" or the "update protocol".

In a typical scenario, more than one program thread (referred to also as mutator thread) and the collector thread run simultaneously, meaning that the update (graying) of the objects is executed also during collection. Thus, not only do the mutators gray objects in parallel one with the other, but they also gray objects in parallel with the collector during trace. Collector, in this context, signifies one or more collector threads.

This manner of operation may create race conditions between mutators, and/or between the collector and the mutators, which is obviously undesired. Race conditions may occur for example in the following scenario. Marking an object gray by the mutators and the handling of gray objects by the collector may occur concurrently. This may create a race condition if there is a need to keep track of the gray objects.

In a multiprocessor environment, previous implementations have either required frequent explicit synchronization between the collector and the mutators in order to keep track of the gray objects (e.g. using a single mark buffer), or have been inefficient and required repeated scans of the heap (or a data structure proportional to the size of the heap) until there are no more gray objects. The first option slows down the mutators and the second option slows down the collector, delaying the collection of garbage.

Turning to the specified second solution of repeatedly scanning the heap to find the gray objects, it requires little synchronization between the mutator threads and the collector thread. However, not only is scanning the heap multiple times inefficient, but it may require bringing every page of the heap into memory, which may be very costly time-wise. This problem may be ameloriated by using a color bitmap (as described in "Garbage Collection" by Richard Jones and Rafael Lins, pp. 87–88) to hold the color representation of objects. However, this still requires multiple scans of the color bitmap, whose size is proportional to the size of the heap, until no grays remain, hence it suffers from the same inefficiency drawback.

In accordance with an alternative approach, queuing gray objects in a mark buffer will eliminate the need for multiple scans by keeping track of all remaining gray objects, i.e., those that still need to be traced by the collector. However, having multiple writing threads to the same mark buffer requires synchronization, which as specified before gives rise to an undesired slow down.

There is accordingly a need in the art to provide for a novel technique which enables to carry out tracing of memory objects, with little or no explicit synchronization. The proposed approach is also useful for other applications which employ multiple writers and single reader.

SUMMARY OF THE INVENTION

In the context of the invention, reference to a memory object should not be construed to any specific data type or size. Object should be construed in a broad manner including any area of memory which is returned in response to an allocation request by a program thread.

Reference to colors of memory objects is provided for illustrative purposes only, indicating corresponding state associated with the memory object.

Thread should be construed in a broad manner including "process".

Whilst, for simplicity, the invention is described with reference to an on-the-fly garbage collection application, those versed in the art will readily appreciate that the invention is by no means bound by this example. Thus, by another non-limiting embodiment, the garbage collection technique of the invention is used with concurrent garbage collection algorithm. It should be further noted that the use of the invention is not necessarily bound to the so called "mark and sweep" algorithm.

In accordance with the broadest aspect of the invention, there is provided a generic data structure associated with at least Insert, Extract and isEmpty operations. The Insert operation is designated for inserting objects to selected parts of the generic data structure by multiple writer threads whilst avoiding (or substantially avoiding) synchronization between the writers. The Extract operation is designated for extracting objects by one or more readers (from selected parts of the generic data structure whilst avoiding (or substantially avoiding) synchronization with any of the writers. The selected parts of the generic data structure that are utilized by the Insert operation may partially or fully overlap the selected parts of the generic data structure that are utilized by the Extract operation, all as required and appropriate, depending upon the particular application.

The isEmpty operation is designated for determining if there are remaining objects in selected parts of the generic data structure. In accordance with the invention the isEmpty operation is not synchronized with either the Insert and the Extract operations thereby bringing about the desired result that no (or substantially no) synchronization exists between the writers and between the writers and one or more readers.

Thus, in accordance with the broadest aspect, the invention provides for a computer implemented method that utilizes at least two writer threads and at least one reader thread wherein said writer threads running on the computer simultaneously with said reader thread, the method comprising the steps of:

(a) providing a generic data structure for said threads; the generic data structure is associated with at least Insert, Extract and isEmpty operations;

(b) inserting objects to selected parts of the generic data structure by at least two writer threads, using said Insert operation;

(c) extracting objects by the reader thread from selected parts of the generic data structure, using said Extract operation;

(d)
determining if there are remaining objects in selected parts of the generic data structure utilizing said isEmpty operation; said isEmpty operation is substantially not synchronized with said Insert and Extract operations;
whereby substantially no synchronization is required between the writer threads themselves; and between said reader threads and said writer threads.

In a preferred embodiment, the proposed technique is utilized for performing garbage collection of unused memory objects in a memory heap. By this embodiment the specified writer threads stand for mutator threads and the reader (or readers) thread(s) stand for respective one or more collector thread. Still further by this embodiment the generic data structure includes a dedicated mark buffer and associated fields for each one of the mutator threads as well as for the collector thread(s).

Using dedicated mark buffer for each respective thread alleviates the problem of potential race between mutator threads, however, this does not cope with a situation in which collector extracts from a mutator mark buffer while the mutator is continuing to add to the mark buffer.

In order to overcome the above problems, there are provided as specified at least three operations, Insert, Extract, and isEmpty which are associated with each mark buffer. Insert inserts an element (being representative of a grayed memory object) to a mark buffer (constituting a part of said generic data structure). Extract, chooses an arbitrary element, removes it from the mark buffer (constituting a part of said generic data structure) and returns it. The order of extraction is determined according to the application, say e.g. FIFO or LIFO. isEmpty returns true if the data structure was empty (i.e. no remaining elements to extract) at the time the isEmpty operation was initiated.

All three operations are done with substantially no synchronization cost or a very little synchronization cost, which can be made arbitrarily small.

Using data structure of the kind specified (associated with the Insert, Extract and isEmpty) enables keeping track of the objects remaining to be traced efficiently, in a manner equal to the number of remaining objects, as opposed to hitherto known techniques where the computational complexity is dependent on the heap size. Thus, in accordance with one prior art technique the heap is repeatedly scanned for examining object colors or in accordance with another hitherto known technique the bit map (which varies in size with the heap) is repeatedly scanned.

As will be explained in greater detail below, using the technique of the invention substantially avoids synchronization between the collector thread performing the Extract operation and the mutator threads performing the Insert operation, and also among the mutator threads themselves.

The collector thread uses the isEmpty operation to check that there are no objects remaining to be traced. This operation is also done substantially without synchronization to the other Extract and/or Insert operations.

In accordance with this preferred embodiment, many mutator threads invoke Insert and preferably, although not necessarily, a single collector thread invokes both Insert and Extract. Accordingly, a reader should be construed also as possibly performing writing operations, i.e. reader/writer.

The implementation employs a buffer for each thread. Each thread can insert an element in its buffer without synchronization. The collector can extract from each of the buffers without synchronization. The check for the completion of tracing (isEmpty) is done by the collector without synchronization; the cost of the check is proportional to the number of threads, and independent of heap size.

John DeTreville [Experience with Concurrent Garbage Collectors for Modula-2+, November, 1990, *Digital Systems Research Center,* © *Digital Equipment Corporation*] describes a seemingly similar buffering scheme for a concurrent reference counting collector. However, his scheme does not allow the collector to access a mutator's buffer at the same time the mutator may be inserting entries. Also, his scheme requires a point in time when all mutator threads are stopped; at that time, the collector can processor the partially filled buffers of the mutators. Thus, his scheme is not appropriate for an on-the-fly collector.

The invention further provides for a system of the kind specified mutatis mutandis: a computer implemented method for performing garbage collection of unused memory objects in a memory heap by at least one collector thread; at least one mutator thread running on the computer simultaneously with said at least one collector thread, the method comprising the steps of:

(a) providing a mark buffer data structure for each one of the mutator and collector threads; each mark buffer is associated with at least three operations, Insert, Extract, and isEmpty, wherein Insert inserts an element representative of a memory object, Extract chooses an arbitrary element representative of a memory object, removes it from the mark buffer, and isEmpty returns true if all the mark buffers include no remaining elements to extract, at the time the operation was initiated;

(b) applying on-the-fly garbage collection in order to collect unused memory objects in the heap; said on the fly garbage collection step includes:

i. the at least one mutator thread acquires, using synchronization primitives, a respective dedicated mark buffer and uses, said Insert, operation for inserting objects to said mark buffer;

ii.

the at least one collector thread uses, said Extract operation for extracting objects from a mark buffer;

determining if there are remaining objects in the mark buffers utilizing said isEmpty operation; said isEmpty operation is substantially not synchronized with said Insert and Extract operations;

whereby substantially no synchronization is required between the mutator threads themselves; and between said at least one collector threads and said mutator threads.

By an alternative embodiment, a concurrent garbage collector is employed instead of said on-the-fly garbage collector.

Still further, the invention provides for a program storage device readable by machine, tangibly embodying a program of instructions executable by the machine to perform method that utilizes at least two writer threads and at least one reader thread wherein said writer threads running on the computer simultaneously with said reader thread, the method comprising the steps of:

(a) providing a generic data structure for said threads; the generic data structure is associated with at least Insert, Extract and isEmpty operations;

(b) inserting objects to selected parts of the generic data structure by the at least two writer threads, using said Insert operation;

(c) extracting objects by the reader thread from selected parts of the generic data structure, using said Extract operation;

(d)

determining if there are remaining objects in selected parts of the generic data structure utilizing said isEmpty operation; said isEmpty operation is substantially not synchronized with said Insert and Extract operations;

whereby substantially no synchronization is required between the writer threads themselves; and between said reader threads and said writer threads.

BRIEF DESCRIPTION OF THE DRAWINGS

For a better understanding, the invention will now be described, by way of example only, with reference to the accompanying drawings, in which.

DESCRIPTION OF SPECIFIC EMBODIMENTS

The invention is described mainly with reference to a preferred embodiment where the generic data structure includes a dedicated mark buffer associated with each one of the mutator threads and a collector thread, for use in an on-the-fly garbage collection application. The generic data structure is associated with an Insert, Extract and isEmpty operations. Obviously, other operations may be employed, all as required and appropriate.

Those versed in the art will readily appreciate that the invention is by no means bound by the specified specific implementation of the generic data structure. The invention is further not bound by the specific implementation of multiple writers and a reader (standing for the mutators thread and the collector thread respectively) that are used for on-the-fly garbage collection application.

Figure 2:
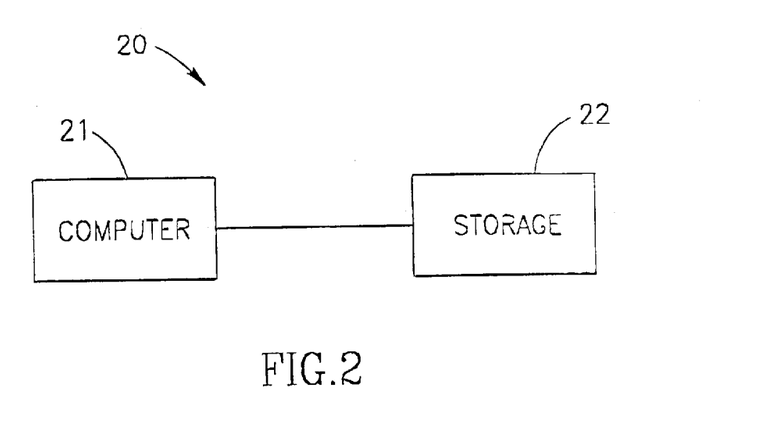
FIG. 2 is a generalized system of the invention for use e.g. in an on-the-fly garbage collection application.

Bearing this in mind, attention is first drawn to FIG. 2 showing a generalized system for use in an on-the-fly garbage collection application of the invention. The system generally includes a computer (21) and associated storage (22). Plurality of mutator threads (not shown) are running on computer (21) and use memory objects (not shown) stored in storage (22) and arranged in memory heap. A collector thread (there may be more than one—not shown) running on computer (21) collects the unused objects in the heap, using on-the-fly garbage collection algorithm, typically, but not necessarily of the mark and sweep type algorithm.

As will be explained in greater detail below, using the proposed technique of the invention enables to accomplish on-the-fly garbage collection, avoiding races between the mutators as well as between the mutators and the collector, whilst utilizing very limited (arbitrarily small) synchronization.

Whilst the description with reference to FIG. 2 refers to computer (21) and storage (22), those versed in the art will readily appreciate that the invention is by no means bound to one computer and one storage medium. Accordingly, computer (21) encompasses not only uni-processor, but any known per se architecture of multi-processor environment, which may reside in one or more physical locations.

In the same manner storage (22) encompasses any known per se storage arrangement associated with one or more processors (20).

Figure 3:
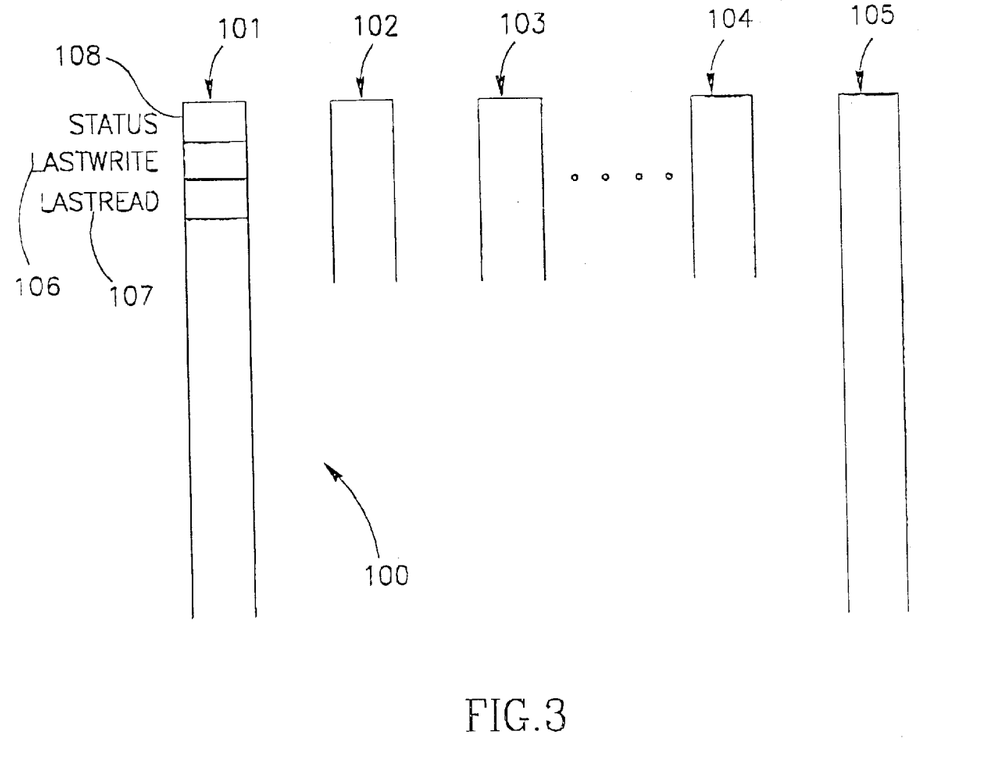
FIG. 3 is a generalized scheme of mark buffers, in accordance with one embodiment of the invention.

In accordance with one embodiment of the invention, as depicted in FIG. 3, there is provided a pool of mark buffers, of which only five are shown (101 to 105), which is created and chained together in e.g. a linked list (not shown in FIG. 3.). For convenience of explanation, the data structure is described with reference to mark buffer (101) implemented by this particular as a FIFO queue.

Thus, mark buffer (101) includes fields for the last slot (or address) in the mark buffer written into (which will be referred to as lastWrite (106)), and for the last slot or address, read by the collector (lastRead)(107). There will also be a status value associated with each mark buffer, whose value is either AVAILABLE, IN_USE or FULL (108).

A mutator thread updating an object during GC must follow an update protocol forming part of the on-the-fly garbage collection. The update protocol is applied when a memory object containing a pointer is updated. As explained above, depending on the stage of the collection, the update protocol will typically gray either the old object referenced, the new object referenced, or both. Once an object has been grayed in accordance with update protocol, it is also inserted into the thread's mark buffer.

In order to inset a new entry into a mark buffer, a thread follows the following protocol (see also FIG. 4):
1. If the thread's current mark buffer is set to NULL (400), the thread obtains a new buffer (401) as explained below with reference to FIG. 5. Step (400) is, in fact, a specific realization of the more general inquiry "Is buffer Empty?".
2. Insert an element representative of a newly grayed memory object to the entry at the next available mark buffer slot (i.e. lastWrite+1) (402).
3. Increment lastWrite (403).
4. If the mark buffer is now full (i.e., the entry was inserted into the last slot) (404), then set the status of the mark buffer to FULL (405) and set the thread's current mark buffer to NULL (406), in order to force the thread to choose a new mark buffer on the next insert.

Figure 4:
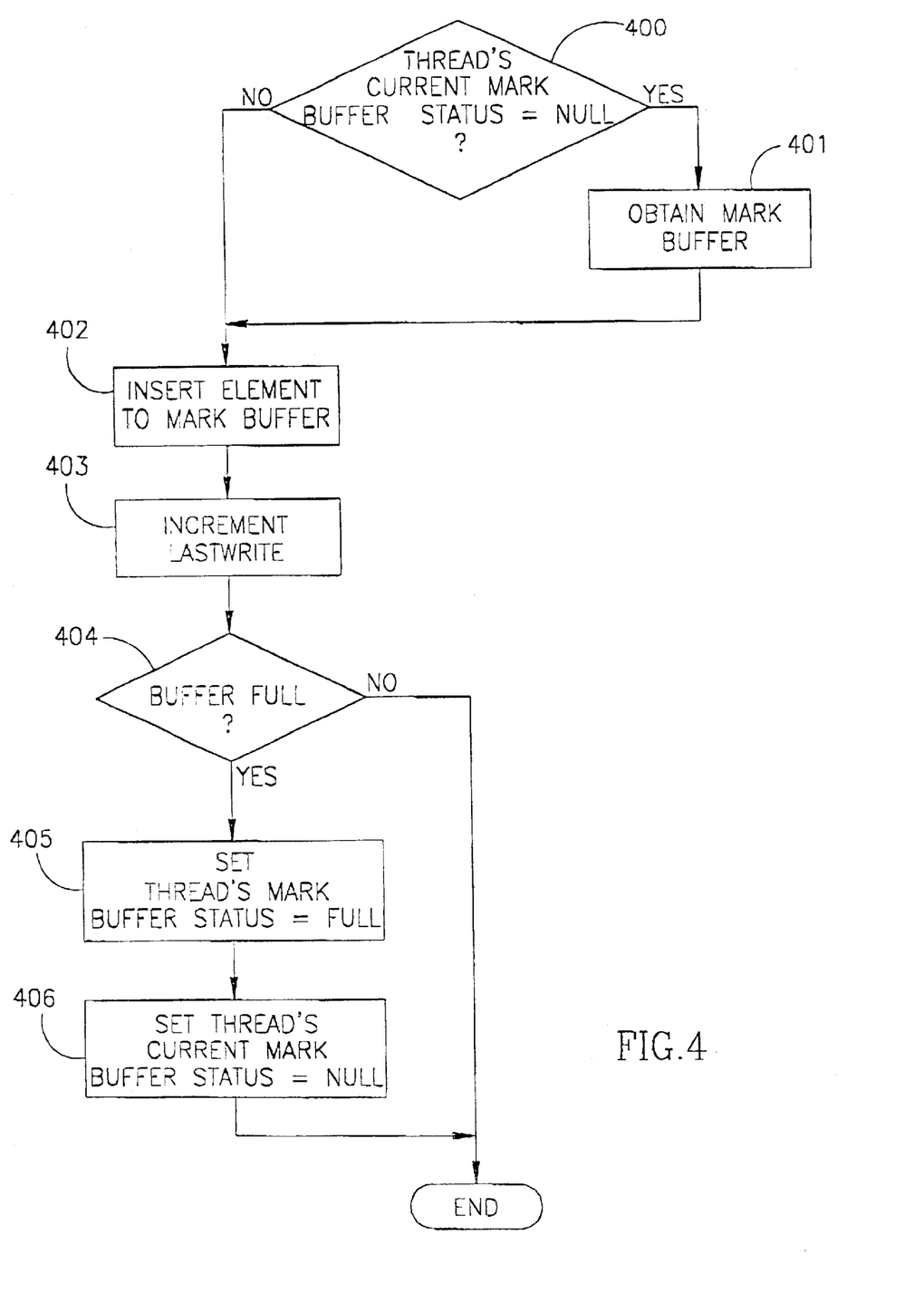
FIG. 4 is a generalized flow chart of an Insert operation, for inserting new objects to a mark buffer, in an on-the-fly garbage collection application, according to one embodiment of the invention.

It should be noted that the order is important: the write of an element (representative of new grayed object) to the mark buffer entry must precede the step of incrementing the value of lastWrite.

Figure 5:
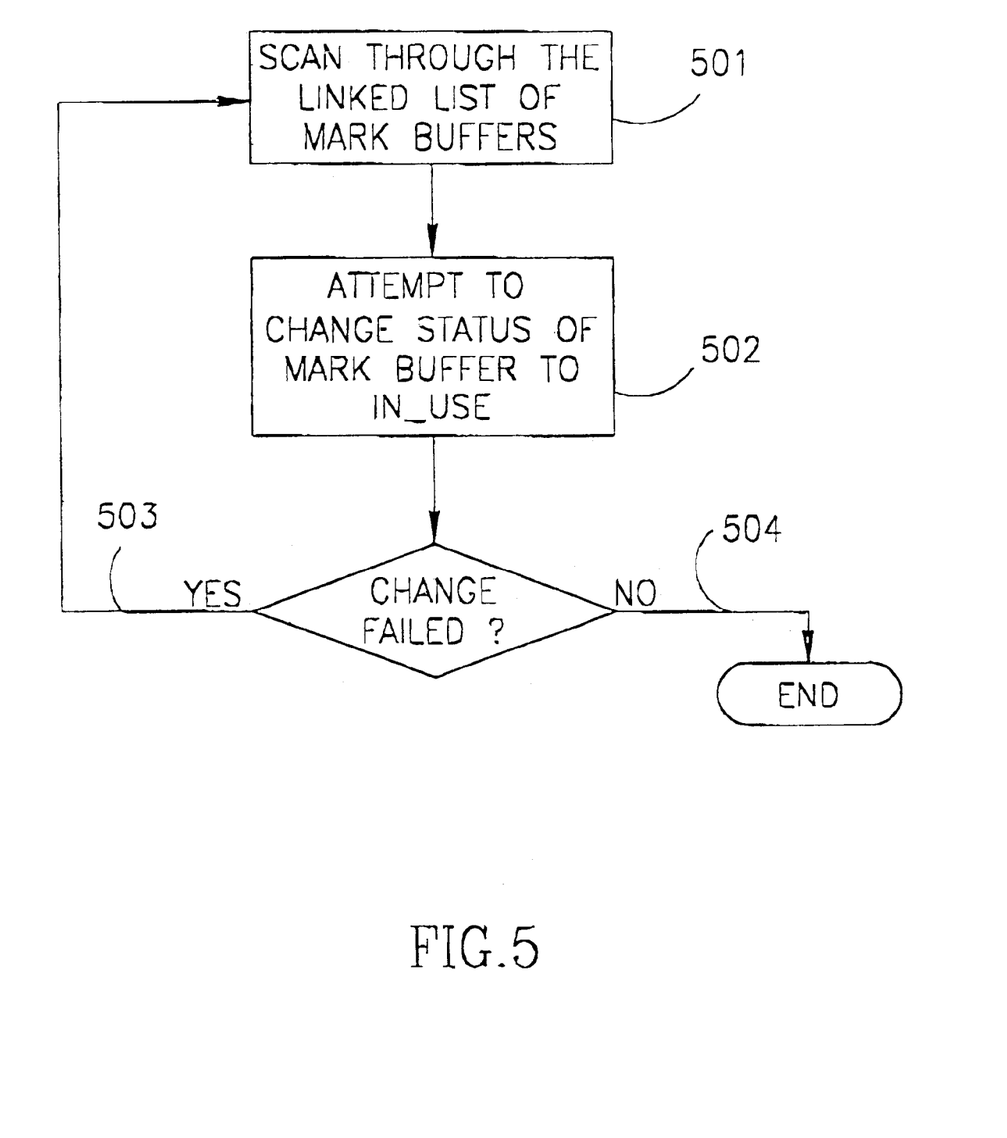
FIG. 5 is a generalized flow chart of a get new mark buffer operation, in an on-the-fly garbage collection application, according to one embodiment of the invention.

Reverting now to the step of obtaining a mark buffer (401), attention is drawn to FIG. 5 elaborating the specified step. It should be noted that a thread (collector or mutator) normally requires a new mark buffer at the start of a collection cycle, or when it fills its current buffer.

To obtain a new mark buffer, a thread follows the following steps (see FIG. 5):
1. Scan through the complete set (e.g. linked list) of mark buffers, looking for an AVAILABLE mark buffer (501).
2. Using synchronization, change the status of the mark buffer from AVAILABLE to IN_USE (502). If another thread has already changed the status to IN_USE, return to step 1 (503).
3. If status change succeeded (504), the mark buffer is reserved for this thread's exclusive use.

It should be noted that in the context of the invention reference to linked list should be considered as one out of many possible variants of realization, all as known per se. Those versed in the art will readily appreciate that the synchronization in accordance with the preferred embodiment of the invention is confined only to the step of obtaining a new mark buffer and may be achieved at a very low cost, for example, using the known per se compare-and-swap atomic operation.

Notice that this synchronization is both low cost and infrequent, since it only occurs when a thread needs a new buffer. The frequency of synchronization can be decreased to an arbitrarily low value by increasing the size of the mark buffers.

Once a mark buffer has been obtained, the thread can write into it without further explicit synchronization.

If there are no available mark buffers, then (in accordance with one out of many possible options) the thread allocates one or more new buffers, links them together, and then links the linked list of new buffers to the end of the linked list of existing mark buffers (not shown). Linking the new buffers at the end of the linked list requires minimal synchronization, e.g. the low cost compare-and-swap mentioned above.

Figure 6:
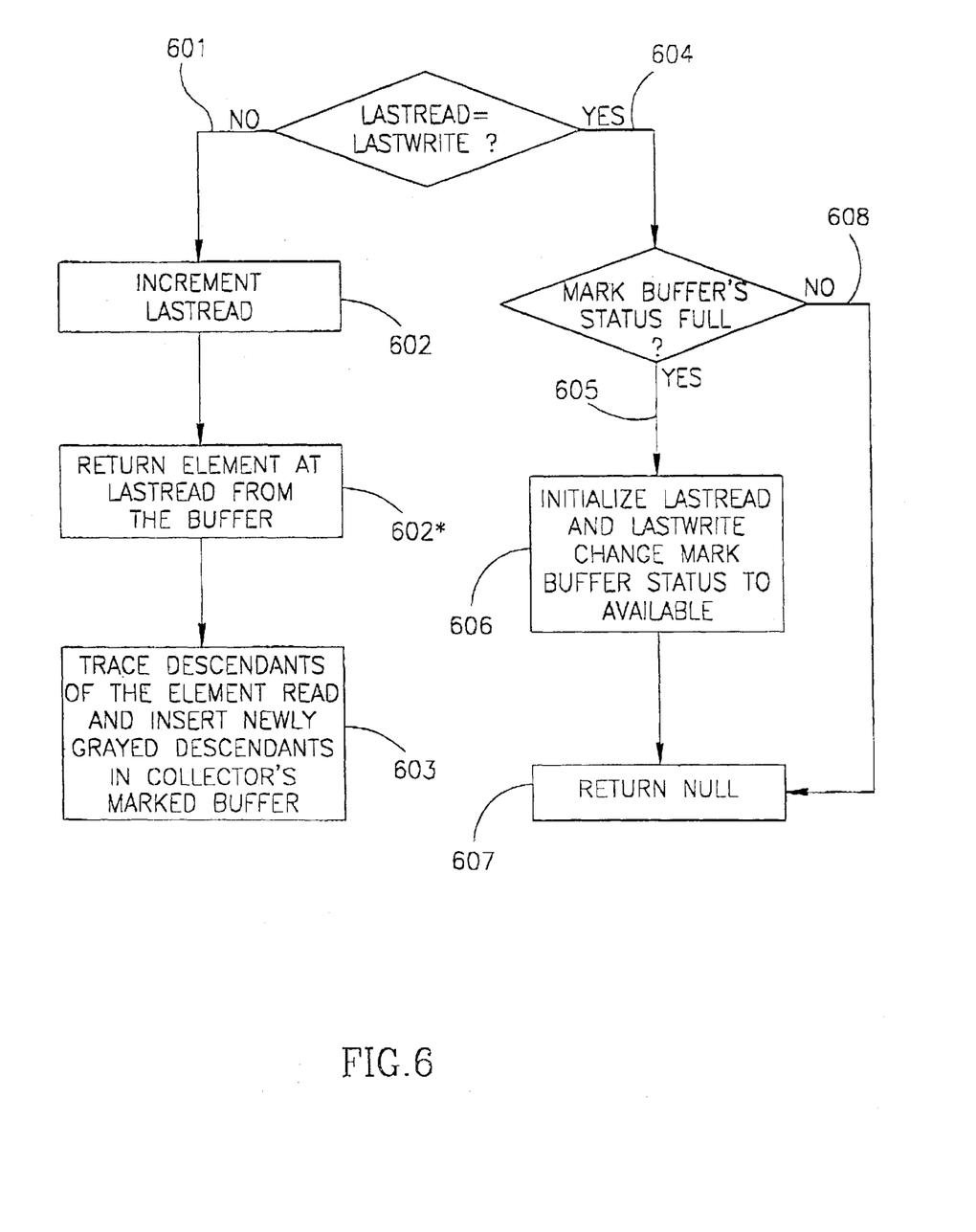
FIG. 6 is a generalized flow chart of an Extract operation, for extracting objects from a mark buffer, in an on-the-fly garbage collection application, according to one embodiment of the invention.

In order to process a mark buffer element during the mark phase, the collector executes the Extract operation as follows (with reference to FIG. 6):
1. If lastRead for the mark buffer is not equal to lastWrite (601):

Increment lastRead for the mark buffer (602)

Read element at LastRead from the buffer (602*)

Trace the descendants of the object referenced from the lastRead slot of the mark buffer inserting the newly grayed descendants on the collector thread's mark buffer (603), all in accordance with the provision of the trace step. It should be noted that there is no need to maintain and update both the "last read" and "last write" values in the collector's mark buffer, since, unlike a mutator's mark buffer which is accessed both by the mutator (for Insert) and by the collector (Extract), the collector's mark buffer is accessed solely by the collector for both the Insert and the Extract operations.

If lastRead is now equal to lastWrite (604), and the mark buffer status if FULL (605), then the collector reinitializes the lastRead and lastWrite values and changes the mark buffer status to AVAILABLE (606). Note that this can be done without synchronization, since the FULL status means that the mutator has finished with the buffer, and accordingly the buffer may be allocated for use by a different mutator (as indicated by the new status AVAILABLE). Following step (606), a NULL value is returned (607). The same value is returned in the case that the mark buffer is not FULL (608).

It should be noted that steps (603) and (606) do not form an integral part of the Extract operation.

Figure 7:
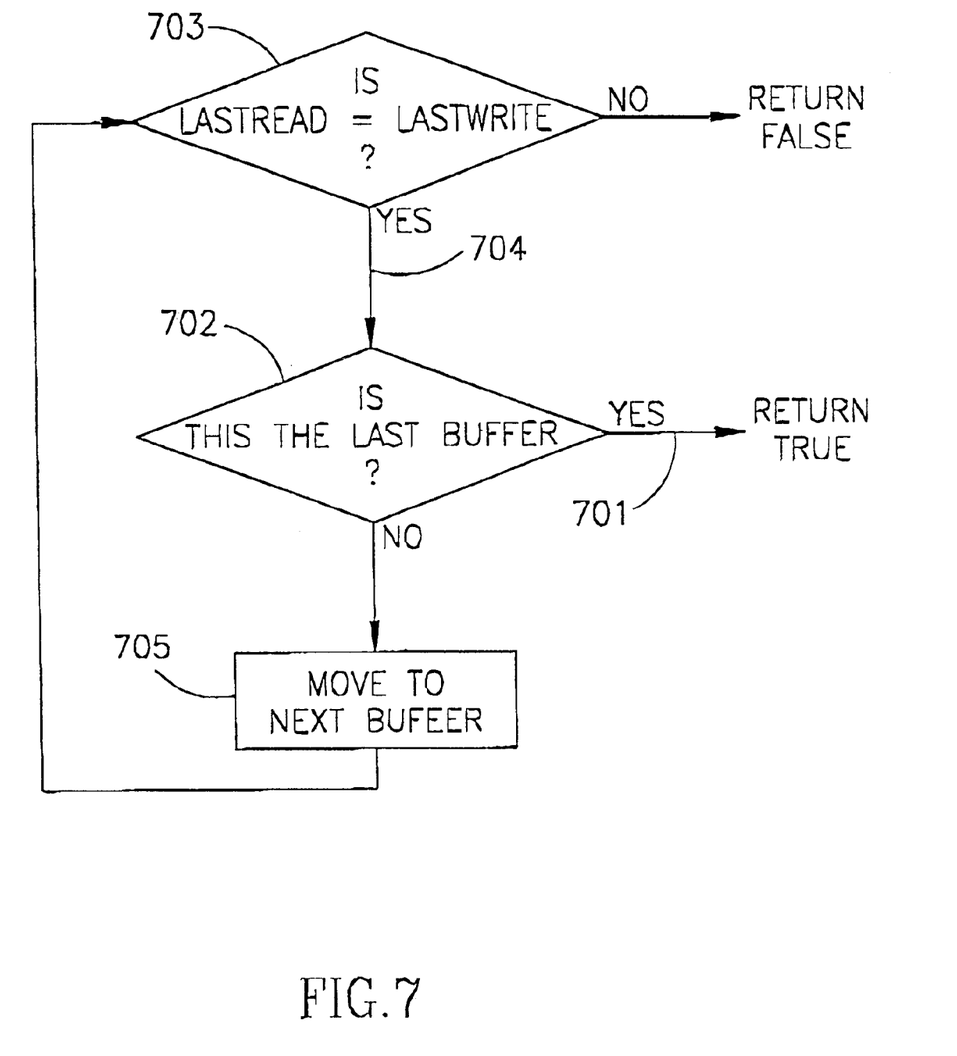
FIG. 7. is a generalized flow chart of an isEmpty operation in an on-the-fly garbage collection application, according to one embodiment of the invention.

Notice that by this embodiment the mark buffers are being used as FIFO queues. This type of processing is appropriate for the mutators' buffers. However, if used for the collector thread's buffer, it will lead to less efficient processing and a breadth-first traversal of the object graph Thus, preferably, the collector's buffers are handled as a LIFO queue. The marking phase is completed when the collector's mark buffer is empty (i.e. no elements remain in the mark buffer), and the collector executes the isEmpty operation with result TRUE. As shown in FIG. 7, isEmpty returns TRUE (701) on a complete pass through the linked list of mark buffers (i.e. all the buffers were scanned (702), finding that for each mark buffer, the lastWrite value is equal to the lastRead value (703 and 704). This means that all grayed objects have been traced and that there are no new gray objects. In the case that step (703) yields 'No', the procedure returns False.

Notice that this termination condition is equivalent to the termination condition used by hitherto known collectors that repeatedly scan the heap until they do not find any new untraced gray objects during one complete scan. However, instead of scanning the heap (according to the prior art), in accordance with the invention, the mark buffers are checked. This is much more efficient since the number of mark buffers is proportional to the number of threads, which is much smaller than the size of the heap, and heap objects are only examined one time.

Having completed the marking phase, the collector can sweep unused objects, in a known per se manner.

Accordingly, a race is avoided and the only synchronization that is required during the entire mark-trace-sweep phase is for obtaining a new mark buffer. This synchronization can be arbitrarily small.

In other words, considering that for each mark buffer only one synchronization operation is required, if the buffer is taken to be sufficiently large, it will never reach "full" state thereby obviating the need to obtain another mark buffer and obviously avoiding another synchronization operation. This is accomplished at the penalty of handling larger buffers (in terms of memory space).

There follows now a description that pertains to the order of executing Load and Store commands and the implication thereof on the correctness of the proposed technique of the invention.

Sequential consistency guarantees that all processors (threads) see the same order on the stores of other processors.

Ensuring sequential consistency for a multiprocessor limits the optimizations that can be done by a single CPU. In particular, it does not allow a single CPU to change the order of its access to memory, even though this change of order is done without changing the meaning or the result of a program running on this processor as a uniprocessor. For example, if the instruction stream consists of a Load of location A followed by a load of location B (where A and B are distinct), the processor could complete the load of B before it completes the load of A. It might do this for example, if A is not in the cache and B is in the cache; then, the processor could initiate the operation to fetch A into the cache and then complete the load of B (since it is in the cache) and then complete the load of A later when it reaches the cache.

There are two types of access to memory—load and store. Varying degrees of memory coherency can be defined by the re-ordering that a processor is allowed to do with respect to loads and stores.

Thus, most multiprocessors use less strict forms of consistency. One such form is called "firm consistency" by IBM. In this form of consistency, a processor is allowed to move the execution of a load past a store; no other exchanges are allowed. For example, if the instruction stream contains a store followed by a load, and the target of the store is not in the cache, the processor may complete the load (and subsequent loads) before it completes the store. There are known even weaker forms than said firm consistency of memory coherency. A non-limiting example of said weaker form is called "weak consistency" by IBM. In this form of consistency, a processor is allowed to re-order the execution of any pair of memory accesses whether load or store. For example, if the instruction stream contains a store to a location A followed by a store to a location B and the target of the first store (A) is not in the cache and the target of the second store (B) is in the cache, the processor may complete the store to B (and subsequent loads) before it completes the first store to A.

In order to circumvent this problem the following modification is applied:

Before a buffer is used, it is initialized to contain all zeroes. Thus, an entry is non-zero only if it has been written by a thread.

When an entry is inserted, it just overwrites the zero in the buffer (no update to lastWrite is required).

When the collector extracts, it checks if the element at lastRead +1 is non-zero, instead of checking lastRead less that lastWrite. If so, there is an element to extract, the collector reads it and increments lastRead.

Having eliminated the use of LastWrite, the risk of replacing the order of steps (402) and (403) is obviously obviated (considering that these steps both concern LastWrite) as is the risk of replacing the order of the memory reads in step (601).

Alphabetic characters and roman symbols are used in the following claims for clarity only and accordingly they should not necessarily imply any specific order of steps. The present invention has been described with a certain degree of particularity but various alterations and modifications may be carried out without departing from the scope of the following Claims:

What is claimed is:

1. A computer implemented method for performing garbage collection of unused memory objects in a memory heap by at least one collector thread; at least one mutator thread running on the computer simultaneously with said at least one collector thread, the method comprising the steps of:
   (a) providing a mark buffer data structure for each one of the mutator and collector threads; each mark buffer is associated with at least three operations, Insert, Extract, and isEmpty, wherein Insert inserts an element representative of a memory object, Extract chooses an arbitrary element representative of a memory object, removes it from the mark buffer, and isEmpty returns true if all the mark buffers include no remaining elements to extract, at the time the operation was initiated;
   (b) applying on-the-fly garbage collection in order to collect unused memory objects in the heap; said on the fly garbage collection step includes:
      i. the at least one mutator thread acquires a respective dedicated mark buffer and uses, said Insert, operation for inserting objects to said mark buffer;
      ii.
         the at least one collector thread uses, said Extract operation for extracting objects from a mark buffer;
         determining if there are remaining objects in the mark buffers utilizing said isEmpty operation; said isEmpty operation is substantially not synchronized with said Insert and Extract operations;
         whereby substantially no synchronization is required between the mutator threads themselves; and between said at least one collector threads and said mutator threads.

2. The method according to claim 1, wherein the at least one collector thread further uses said Insert operation for inserting objects to a respective dedicated collector mark buffer that forms part of said mark buffers, and said Extract operation for extraction of objects from said respective dedicated mark buffer.

3. The method of claim 1, wherein said on-the-fly garbage collection utilizes mark and sweep algorithm.

4. The method according to claim 1, wherein each one of said mark buffers is realized as a FIFO or LIFO queue data structures.

5. The method according to claim 1, wherein said insert operation includes the steps of:
   (a) inserting an element representative of a newly grayed memory object to the entry at the next available mark buffer slot (lastWrite +1); and
   (b) incrementing lastWrite.

6. The method according to claim 5, wherein said insert operation includes the step of acquiring a new buffer, which includes:
  (a) scanning through the linked list of mark buffers, looking for an AVAILABLE mark buffer;
  (b) using synchronization, changing the status of the mark buffer from AVAILABLE to IN_USE; if another thread has already changed the status to IN_FUSE, return to step (a);
  (c) if status change succeeded, the mark buffer is reserved for this thread's exclusive use.

7. The method according to claim 1, wherein said extract operation includes the steps of
  (a) if lastRead for the mark buffer is not equal to lastWrite Increment lastRead for the mark buffer; and
  (b) read element at LastRead from the buffer.

8. The method according to claim 1, wherein said isEmpty operation includes:
  (a) returning TRUE on a complete pass through the linked list of mark buffers, wherein all the buffers were scanned finding that for each mark buffer, the lastWrite value is equal to the lastRead value;
  (b) in the case that 'No' is returned, the procedure returns False.

9. The method according to claim 1, wherein each mark buffer is associated with the following fields that include LastRead indicating the last element that is extracted from the mark buffer, LastWrite indicating the last element that is inserted to the mark buffer, and Status indicating whether the mark buffer is Available, In use or Full.

10. The method according to claim 1, for use in sequential consistency memory coherency models.

11. The method according to claim 1, for use in firm memory coherency models.

12. The method according to claim 1, for use in weaker memory coherency models.

13. A computer implemented method that utilizes at least two writer threads and at least one reader thread wherein said writer threads running on the computer simultaneously with said reader thread, the method comprising the steps of:
  (a) providing a generic data structure for said threads; the generic data structure is associated with at least Insert, Extract and isEmpty operations;
  (b) inserting objects to selected parts of the generic data structure by the at least two writer threads, using said Insert operation;
  (c) extracting objects by the reader thread from selected parts of the generic data structure, using said Extract operation;
  (d)
    determining if there are remaining objects in selected parts of the generic data structure utilizing said isEmpty operation; said isEmpty operation is substantially not synchronized with said Insert and Extract operations;
    whereby substantially no synchronization is required between the writer threads themselves; and between said reader threads and said writer threads.

14. The method according to claim 13, wherein at least one of said reader thread being also a writer thread.

15. The method according to claim 13, for use in an application for performing garbage collection of unused memory objects in a memory heap by at least one collector thread, constituting said at least one reader thread and at least two mutator thread constituting said at least two writer thread; said at least one mutator thread running on the computer simultaneously with said at least one collector thread.

16. A computer implemented method for performing garbage collection of unused memory objects in a memory heap by at least one collector thread; at least one mutator thread running on the computer simultaneously with said at least one collector thread, the method comprising the steps of:
  (a) providing a mark buffer data structure for each one of the mutator and collector threads; each mark buffer is associated with at least three operations, Insert, Extract, and isEmpty, wherein Insert inserts an element representative of a memory object, Extract chooses an arbitrary element representative of a memory object, removes it from the mark buffer, and isEmpty returns true if all the mark buffers include no remaining elements to extract, at the time the operation was initiated;
  (b) applying concurrent garbage collection in order to collect unused memory objects in the heap; said concurrent garbage collection step includes:
    i. the at least one mutator thread acquires a respective dedicated mark buffer and uses, said Insert, operation for inserting objects to said mark buffer;
    ii.
      the at least one collector thread uses, said Extract operation for extracting objects from a mark buffer;
      determining if there are remaining objects in the mark buffers utilizing said isEmpty operation; said isEmpty operation is substantially not synchronized with said Insert and Extract operations;
      whereby substantially no synchronization is required between the mutator threads themselves; and between said at least one collector threads and said mutator threads.

17. The method according to claim 16, wherein the at least one collector thread further uses said Insert operation for inserting objects to a respective dedicated collector mark buffer that forms part of said mark buffers, and said Extract operation for extraction of objects from said respective dedicated mark buffer.

18. A computer implemented system for performing garbage collection of unused memory objects in a memory heap by at least one collector thread; at least one mutator thread running on the computer simultaneously with said at least one collector thread, the system comprising:
  (a) a mark buffer data structure for each one of the mutator and collector threads; each mark buffer is associated with at least three operations, Insert, Extract, and isEmpty, wherein Insert inserts an element representative of a memory object, Extract chooses an arbitrary element representative of a memory object, removes it from the mark buffer, and isEmpty returns true if all the mark buffers include no remaining elements to extract, at the time the operation was initiated;
  (b) on-the-fly garbage collector for collecting unused memory objects in the heap; said on the fly garbage collector includes:
    i. the at least one mutator thread acquires a respective dedicated mark buffer and uses, said Insert, operation for inserting objects to said mark buffer;
    ii.
      the at least one collector thread uses, said Extract operation for extracting objects from a mark buffer;

determining if there are remaining objects in the mark buffers utilizing said isEmpty operation; said isEmpty operation is substantially not synchronized with said Insert and Extract operations;

whereby substantially no synchronization is required between the mutator threads themselves; and between said at least one collector threads and said mutator threads.

19. A computer implemented system for performing garbage collection of unused memory objects in a memory heap by at least one collector thread; at least one mutator thread running on the computer simultaneously with said at least one collector thread, the system comprising:

(a) a mark buffer data structure for each one of the mutator and collector threads; each mark buffer is associated with at least three operations, Insert, Extract, and isEmpty, wherein Insert inserts an element representative of a memory object, Extract chooses an arbitrary element representative of a memory object, removes it from the mark buffer, and isEmpty returns true if all the mark buffers include no remaining elements to extract, at the time the operation was initiated;

(b) concurrent garbage collector for collecting unused memory objects in the heap; said concurrent garbage collector includes:

i. the at least one mutator thread acquires a respective dedicated mark buffer and uses, said Insert, operation for inserting objects to said mark buffer;

ii.

the at least one collector thread uses, said Extract operation for extracting objects from a mark buffer;

determining if there are remaining objects in the mark buffers utilizing said isEmpty operation; said isEmpty operation is substantially not synchronized with said Insert and Extract operations;

whereby substantially no synchronization is required between the mutator threads themselves; and between said at least one collector threads and said mutator threads.

20. A computer implemented system that utilizes at least two writer threads and at least one reader thread wherein said writer threads running on the computer simultaneously with said reader thread, the system comprising:

(a) a generic data structure for said threads; the generic data structure is associated with at least Insert, Extract and isEmpty operations;

(b) means for inserting objects to selected parts of the generic data structure by the at least two writer threads, using said Insert operation;

(c) means for extracting objects by the reader thread from selected parts of the generic data structure, using said Extract operation;

(d)

means for determining if there are remaining objects in selected parts of the generic data structure utilizing said isEmpty operation; said isEmpty operation is substantially not synchronized with said Insert and Extract operations;

whereby substantially no synchronization is required between the writer threads themselves; and between said reader threads and said writer threads.

21. A program storage device readable by machine, tangibly embodying a program of instructions executable by the machine to perform method that utilizes at least two writer threads and at least one reader thread wherein said writer threads running on the computer simultaneously with said reader thread, the method comprising the steps of:

(a) providing a generic data structure for said threads; the generic data structure is associated with at least Insert, Extract and isEmpty operations;

(b) inserting objects to selected parts of the generic data structure by the at least two writer threads, using said Insert operation;

(c) extracting objects by the reader thread from selected parts of the generic data structure, using said Extract operation;

(d)

determining if there are remaining objects in selected parts of the generic data structure utilizing said isEmpty operation; said isEmpty operation is substantially not synchronized with said Insert and Extract operations;

whereby substantially no synchronization is required between the writer threads themselves; and between said reader threads and said writer threads.

* * * * *